Figure 10:
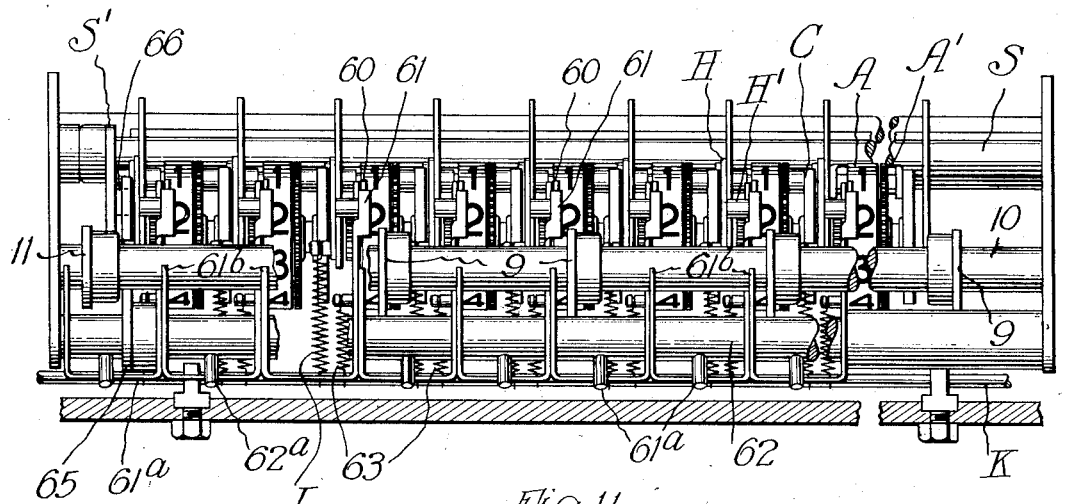

C. W. GOOCH.
ADDING AND SUBTRACTING MACHINE.
APPLICATION FILED JAN. 29, 1915. RENEWED MAY 4, 1917.
1,246,087.
Patented Nov. 13, 1917.
7 SHEETS—SHEET 1.
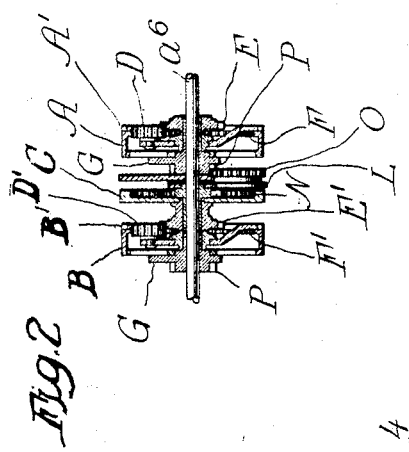
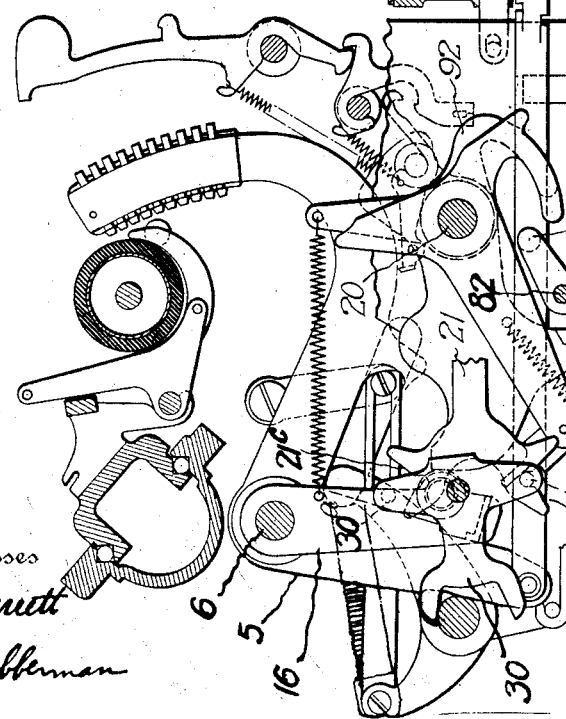
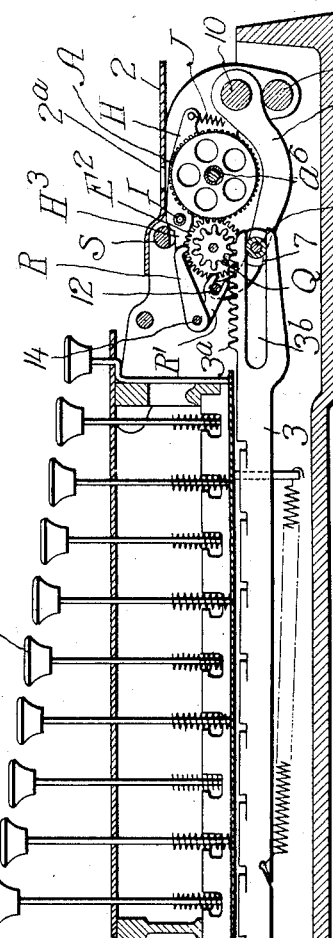
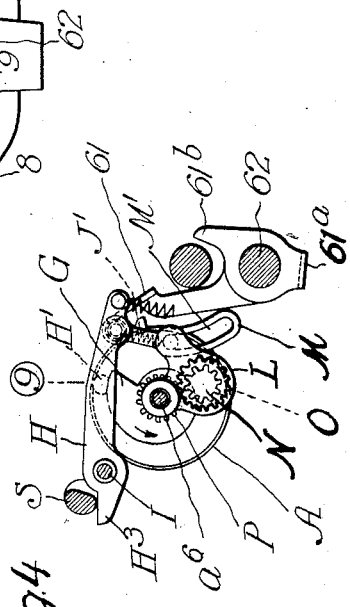
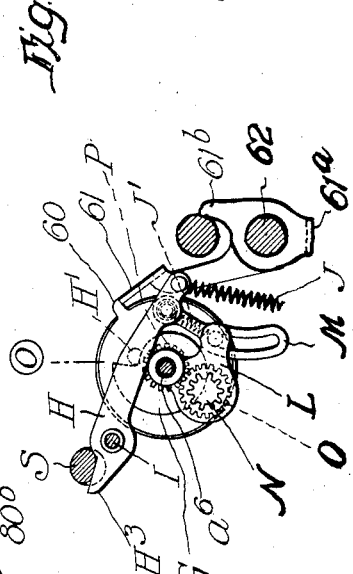

C. W. GOOCH.
ADDING AND SUBTRACTING MACHINE.
APPLICATION FILED JAN. 29, 1915. RENEWED MAY 4, 1917.
1,246,087.
Patented Nov. 13, 1917.
7 SHEETS—SHEET 2.
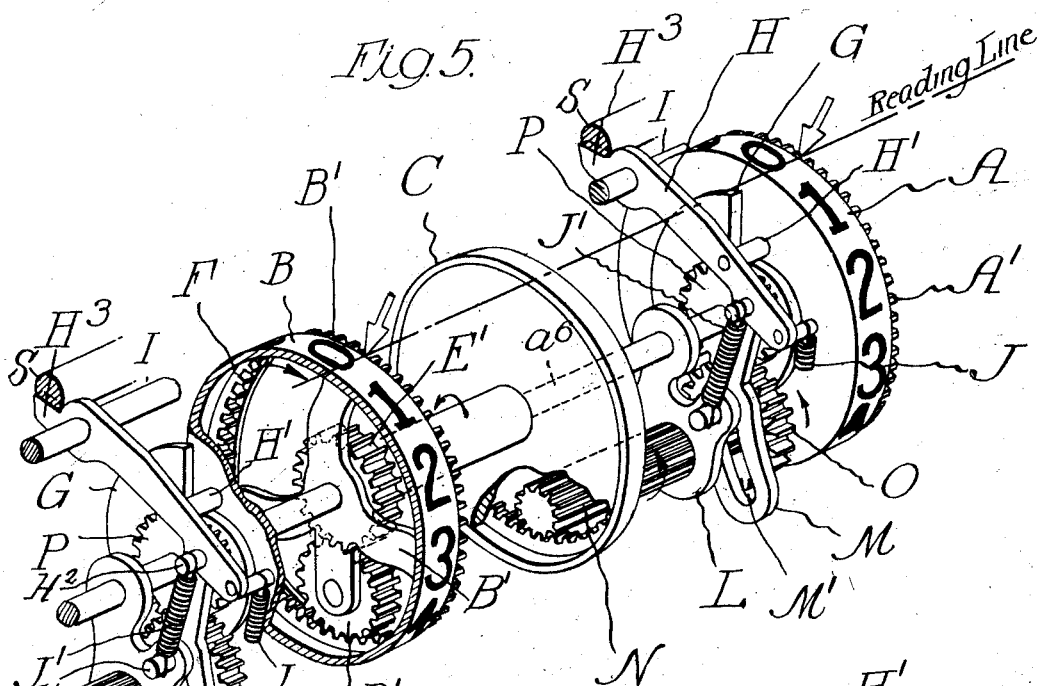
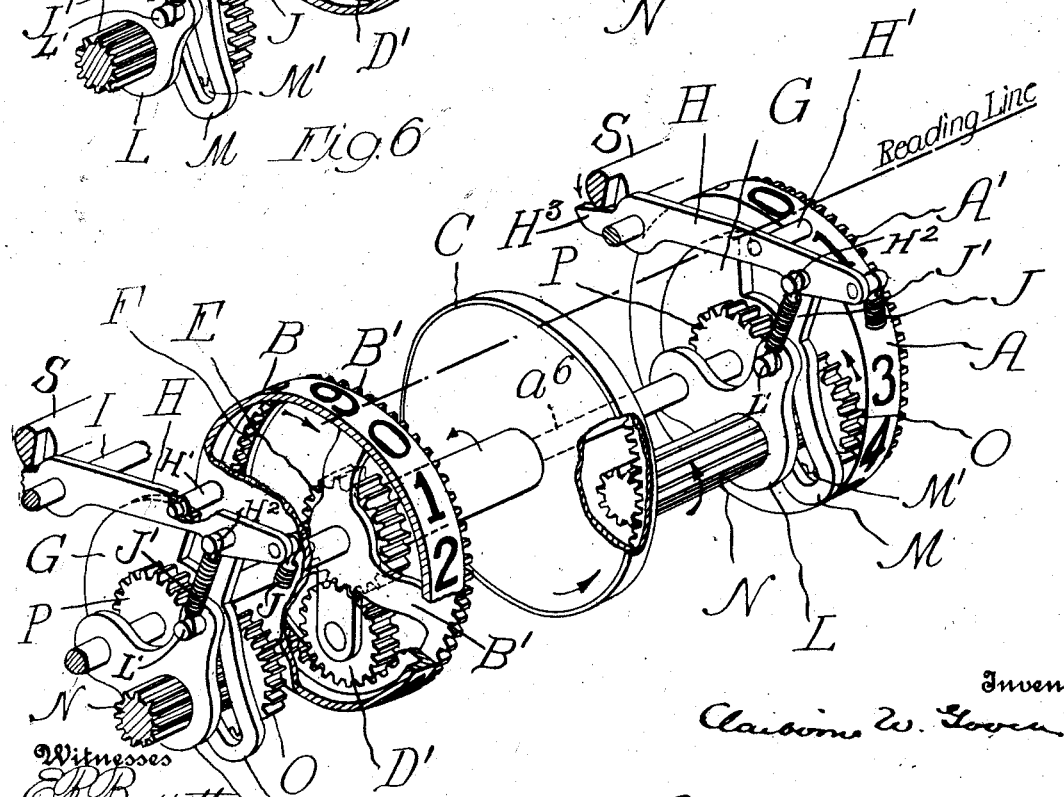

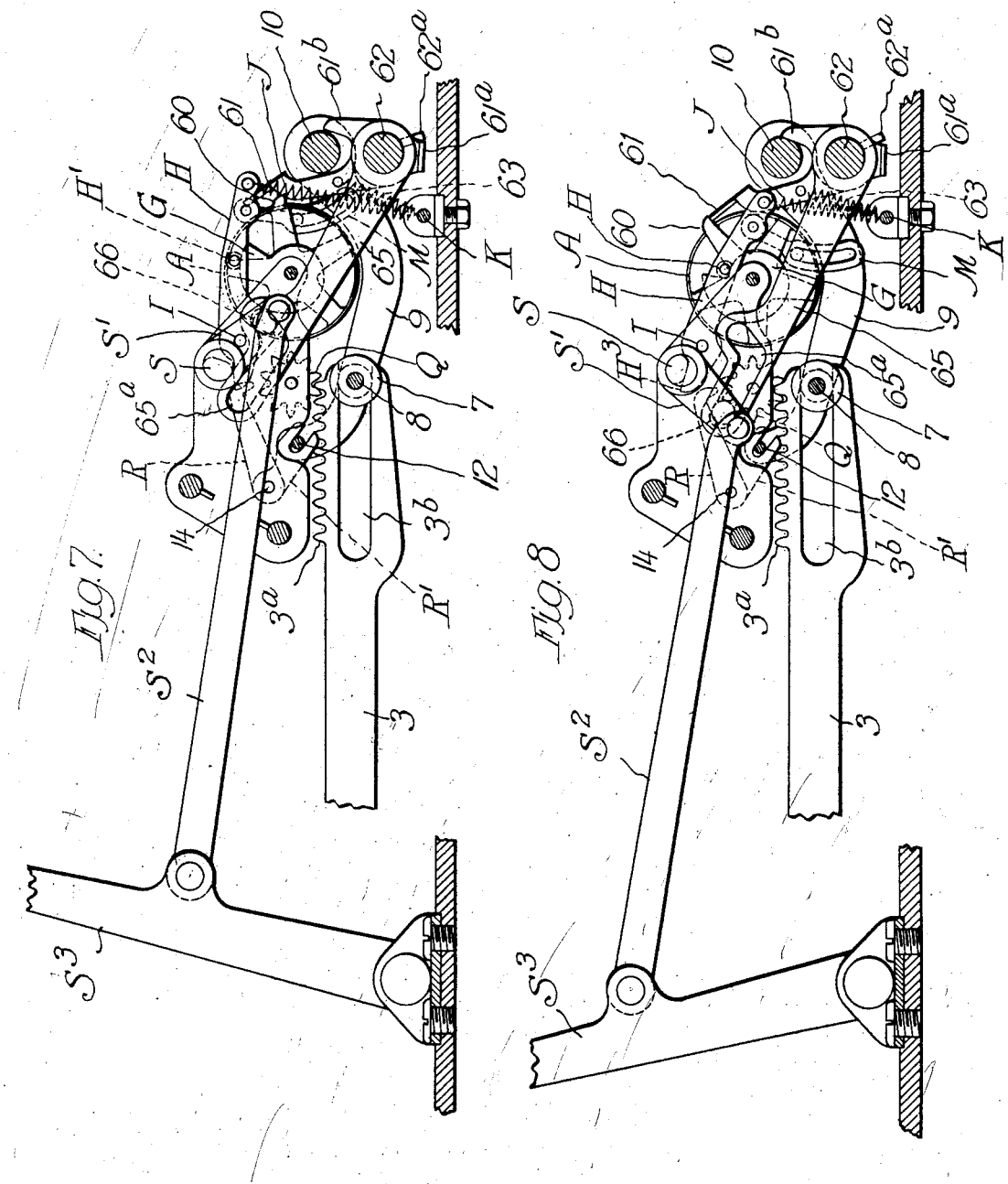

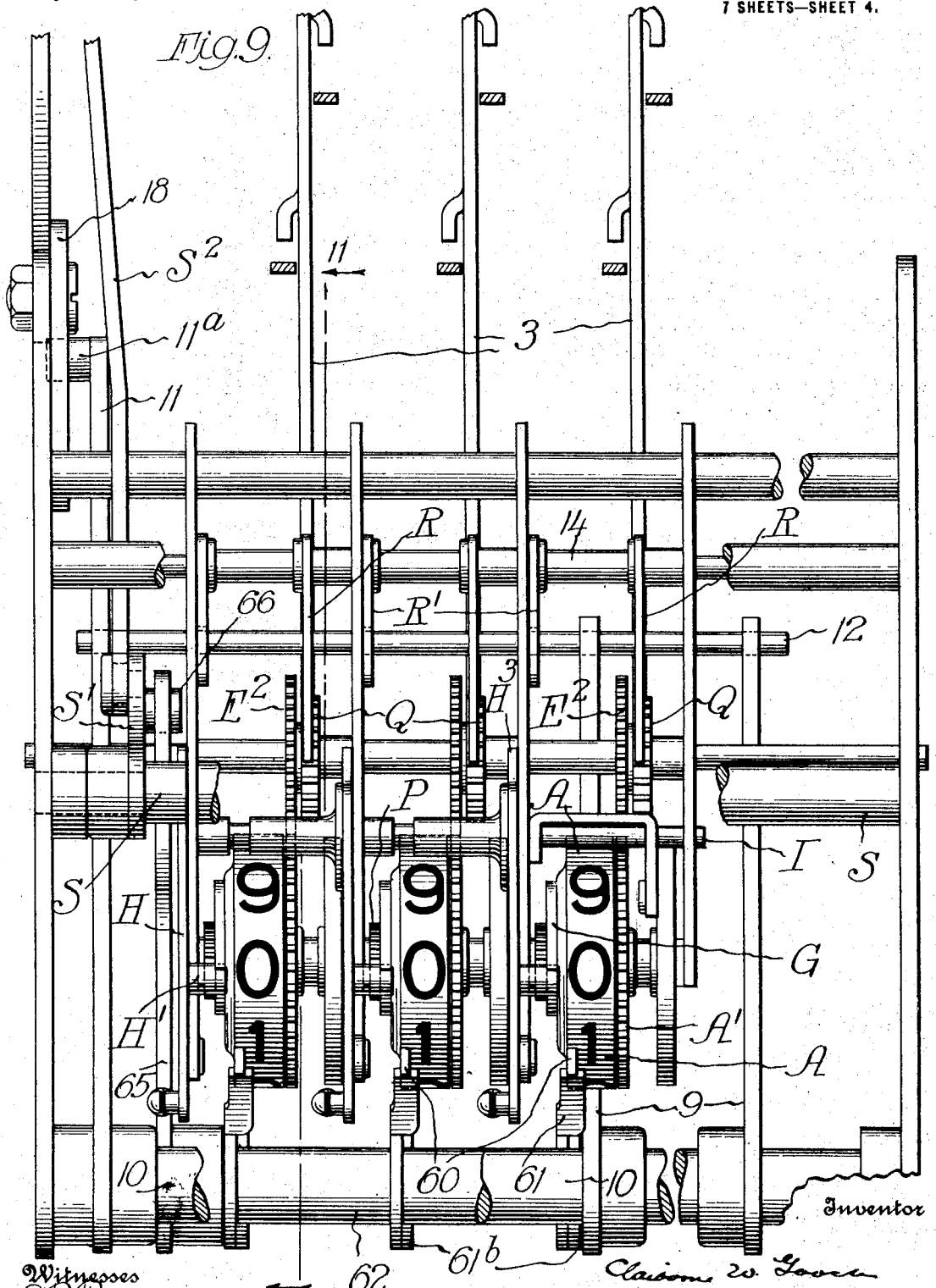

C. W. GOOCH.
ADDING AND SUBTRACTING MACHINE.
APPLICATION FILED JAN. 29, 1915. RENEWED MAY 4, 1917.

1,246,087.

Patented Nov. 13, 1917.
7 SHEETS—SHEET 5.

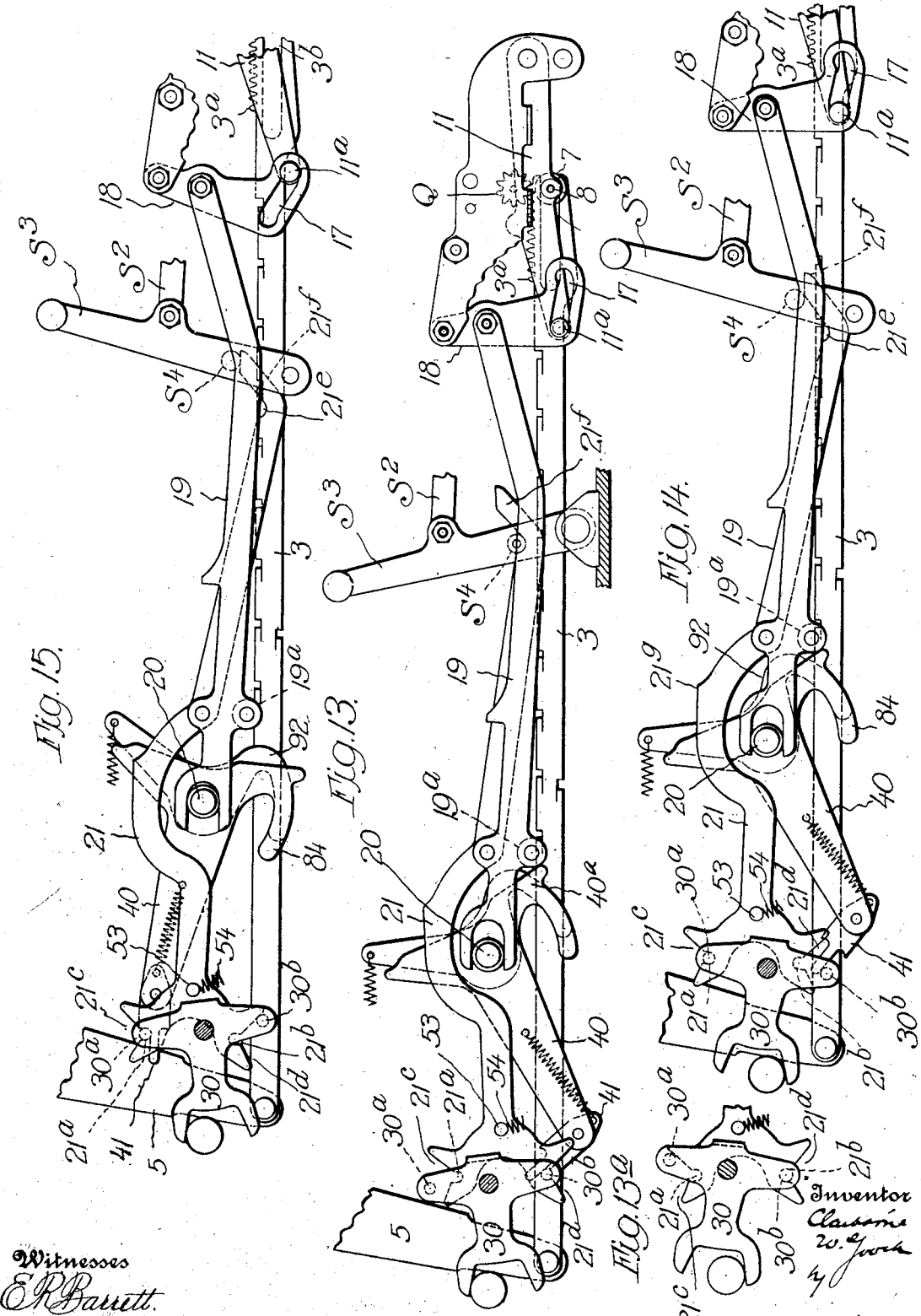

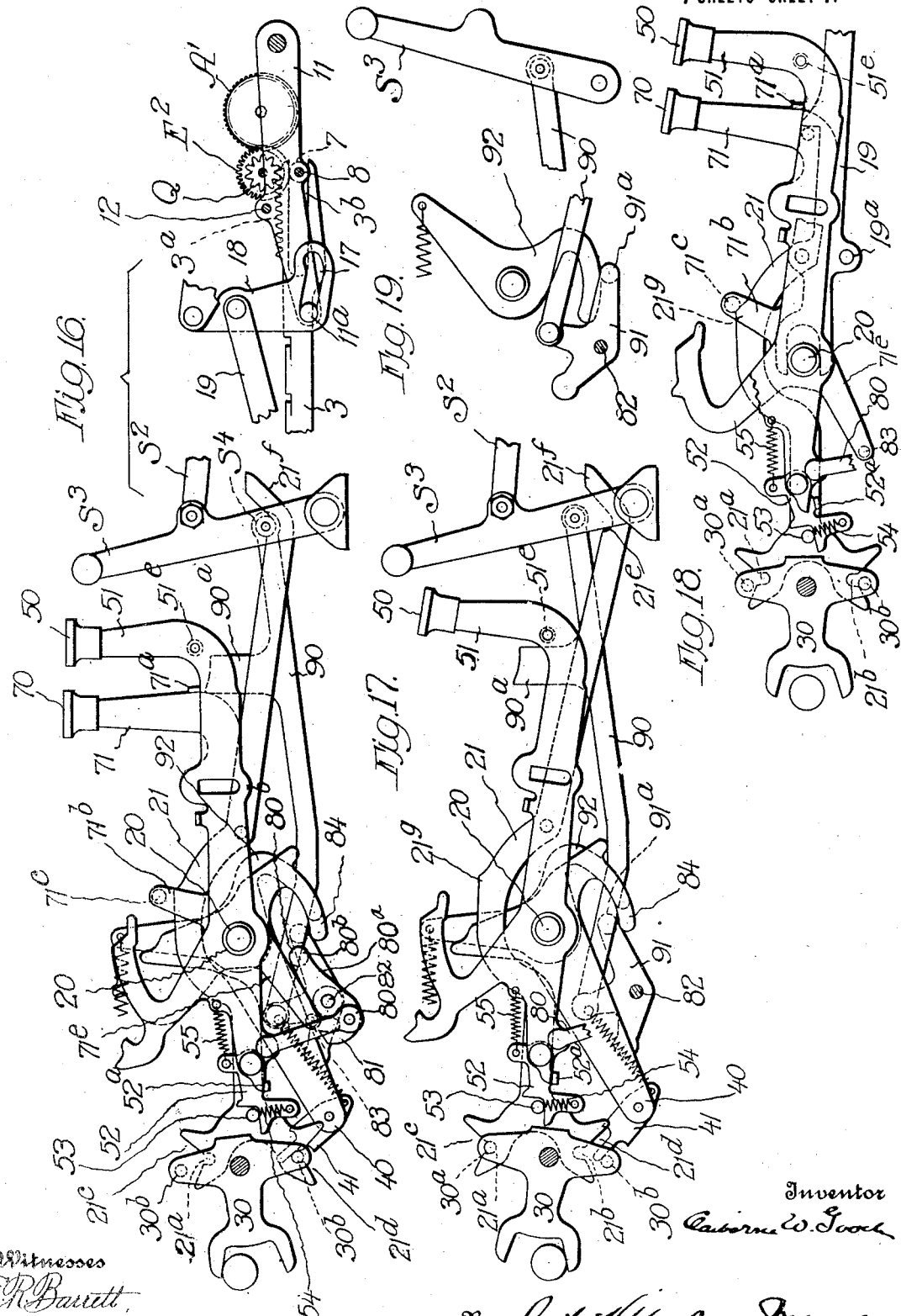

UNITED STATES PATENT OFFICE.

CLAIBORNE W. GOOCH, OF DETROIT, MICHIGAN, ASSIGNOR TO BURROUGHS ADDING MACHINE COMPANY, OF DETROIT, MICHIGAN, A CORPORATION OF MICHIGAN.

ADDING AND SUBTRACTING MACHINE.

1,246,087.   Specification of Letters Patent.   Patented Nov. 13, 1917.

Application filed January 29, 1915, Serial No. 5,134. Renewed May 4, 1917. Serial No. 166,492.

*To all whom it may concern:*

Be it known that I, CLAIBORNE W. GOOCH, a citizen of the United States, residing at Detroit, in the county of Wayne and State of Michigan, have invented certain new and useful Improvements in Adding and Subtracting Machines, of which the following is a specification.

The main object of the present invention is to adapt registering mechanism of the sort disclosed in my prior application (Serial No. 820,680, filed February 24, 1914) patented Feb. 16, 1915 Number 1,128,679 to direct use for purposes of subtraction, and to accomplish this without recourse to the introduction of an additional set of registering wheels or additional gearing. The basic principle upon which the mechanism of my aforesaid prior invention operates is such as to lend itself to the performance of direct subtraction through a comparatively simple change in the relationship of elements of the mechanism. Thus by performing an act similar to that performed with said mechanism for zeroizing the registering wheels, as illustrated and described in my aforesaid former patent, but without locking certain intermediate gear wheels (as in the case of that zeroizing), the mechanism is properly prepared for the performance of subtraction by reverse rotation of the registering wheels, all necessary borrowing being effected through the medium of the same planetary gearing which, in additive operations, effects carrying. According to my said prior invention certain planetary gearing interposed between a lower and a higher order registering wheel operates periodically under control of a snail cam on the lower wheel to advance the higher wheel a full step as an incident to the passing of the lower wheel from its highest registering position on to zero. By suspending the coöperative relationship between such cam and the planetary gearing, in carrying out my present invention, I utilize the same planetary gearing for borrowing from the higher wheel by gradual or divided movement as distinguished from the periodical planetary action above referred to, in which connection the planetary gears serve merely as intermediate pinions, except that in the preliminary setting for subtraction there is a planetary action of these gears to take up any necessary part of the complete borrowing movement as governed by the registering state of the lower wheel.

By my present invention I not only accomplish the above result but I utilize registering mechanism of the character indicated, in an adding and listing machine of the key-set crank-operated type having not only the capacity for listing successive added or subtracted amounts but also the capacity for automatically printing totals and remainders. (My former patent deals more especially with machines of the key-driven type.)

Of various known adding and listing machines of the key-set crank-operated type, I have chosen for the present purpose of affording a concrete instance of the embodiment of my present invention, the machine which is quite extensively known upon the market as the "Burroughs Visible", a machine which is a redesign of one formerly known upon the market as the "Pike", the particulars of which are disclosed in a number of prior patents, e. g., No. 763,692, issued June 28, 1904 and No. 955,789, issued January 19, 1910.

Figure 11:
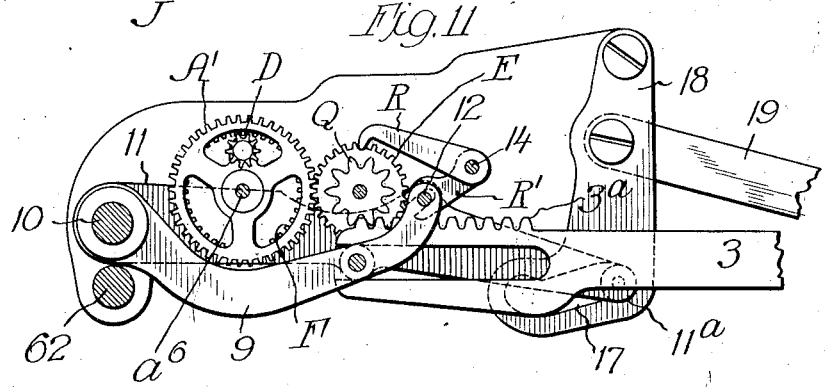
Figure 12:
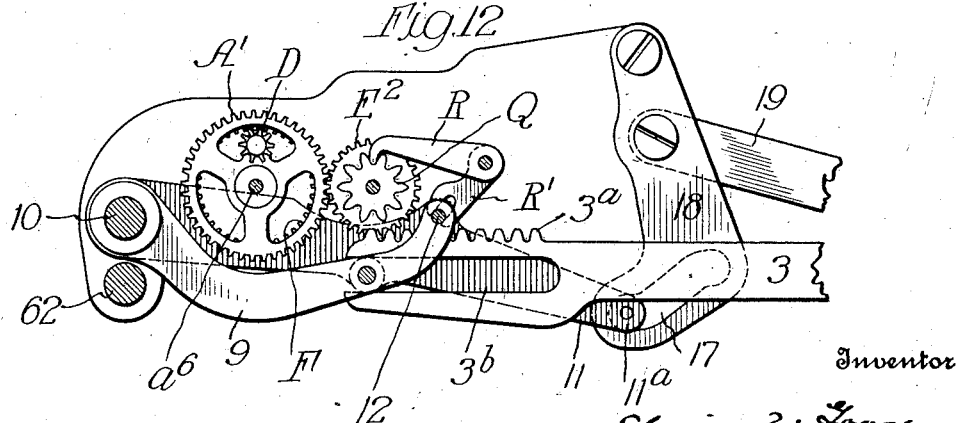

Of the drawings which accompany and form part of this specification, Figure 1 represents in sectionalized left-side elevation an adding and listing machine of the type just referred to having incorporated therein mechanism for embodying my present invention; Fig. 2 is an axial section of the registering mechanism located at the front of the machine, said section embracing two of the registering wheels; Figs. 3 and 4 are corresponding vertical cross sections of the registering mechanism, the former figure illustrating an adding condition and the latter figure a subtracting condition; Figs. 5 and 6 are diagrammatic perspectives illustrating adding and subtracting conditions respectively; Figs. 7 and 8 are corresponding left-side elevations of the registering mechanism and certain controlling devices, the former figure illustrating a subtracting condition and the latter an adding condition; Fig. 9 is a broken plan view of the registering mechanism on an enlarged scale; Fig. 10 is a broken front elevation; Figs. 11 and 12 are sectional right side elevations (on line 11—11 of Fig. 9), the former illustrating a normal condition and the latter the condition when the machine is half operated; Figs. 13 and 14 are left side elevations devoted more especially to the control mechanism, the former figure illustrating the adding condition and the latter the subtracting condition prior to the operation of the machine; Fig. 13ª shows certain of the parts as relatively positioned at the middle of an adding operation; Fig. 15 is a view similar to Fig. 14 illustrating the condition as the last half cycle of a subtracting operation of the machine begins; Figs. 16 and 17 are views of a somewhat similar character devoted more especially to illustrating the totaling devices, Fig. 16 showing a normal condition and Fig. 17 showing the total key down; Fig. 18 is a similar view showing the sub-total key down; Fig. 19 is a view of the same general character, though confined to a few parts and having to do with an interlock between the subtraction key and the actuating mechanism of the machine.

Referring first to the registering mechanism and particularly to the illustration thereof supplied by Fig. 2, and employing reference characters corresponding with those used in my said prior application, the letters A and B designate respectively a lower and a higher order registering wheel each inscribed on its periphery from 1 to 9 with an intervening cipher, as shown in Figs. 9 and 10, with the numbers increasing in clockwise direction, looking from the left, as in Figs. 1, 3 and 4. The letters A′ and B′ designate external gear wheels associated with said wheels A and B respectively, their webs carrying planetary pinions D and D′ which mesh with internal gears F and F′ on the wheels A and A′ and with sun gears E and E′. In the case of the wheel of lowest order such sun gear is fixed whereas similar sun gears of other orders are rotatable and there is affixed to the hub of each of these higher order sun gears an internal gear wheel C. Thus far the construction is substantially identical with that of Horton Patent 1,016,501, issued February 6, 1912, to which reference is made in the specification of my aforesaid application, and it will be understood that it is the turning of the intermediate internal gear wheel C by a lower order numeral wheel in a clockwise direction (again viewing the parts from the left) which transmits the carrying movement to the next higher wheel. Further applying reference characters to correspond with those used in my prior application, the letter G designates a snail back cam fastened to the lower order wheel and the letter H designates an arm pivoted upon a cross-rod I and extending adjacent said cam and having a laterally projecting stud H′ overlying the periphery of the cam, said arm being drawn downward by a spring J which connects it with a lower cross-rod K. The reference letter L designates an oscillatory gear carrier in the form of a plate hung upon the axis-rod $a^6$ about which the wheels A and B turn. Reduced portions of the hubs of the latter supply bearings for the wheels A′ and B′ and a similar reduced portion of the hub of the gear carrier L supplies a bearing for the wheel C and attached sun gear E. The pivoted arm H is connected by a link M with the gear carrier L so that the latter will be oscillated in the rising and falling of said arm. A planetary pinion N on one side of said gear carrier meshes with the internal gear C and a larger planetary pinion O on the other side of the gear carrier meshes with a sun gear P which is integral with the cam G, said two pinions being secured to the same hub or journal which has its bearing in said carrier.

The additive operation is the same as that described in my aforesaid application, the numeral wheels being primarily actuated by the turning of their respective gear wheels A′ and B′ and the arm H being gradually elevated by the action of the cam G upon the stud H′ which action is accompanied by swinging of the gear carrier L in a counter-clockwise direction, its pinion N rolling upon the internal gear C and its pinion O rolling around the sun gear P which is, of course, in effect as part of the lower numeral wheel. Then when the shoulder of the cam passes the stud H′ the arm H is pulled down by its spring J and the gear carrier thereby swung in a clockwise direction with the result of turning the internal gear C in a clockwise direction and thereby transmitting a carrying movement to the higher order wheel.

As also illustrated and explained in my said prior application a zeroizing of the wheels may be effected by lifting the arms H (of which there is one for each wheel), and in the key-driven machine of said application this is practised through the medium of a bail which picks up said arms wherever they may happen to be positioned, as a result of the varied turning of the numeral wheels, and lifts them off of the cams while the numeral wheels are unlocked and the intermediate internal wheels C are locked against backward rotation, with the result that all higher order wheels are rotated forward to the "9" position and the units wheel to zero, the zeroizing being then completed by the carrying action which thereupon ensues. In this operation the internal gear wheels C supply fixed racks upon which the planetary pinions N travel and the pinions O (which are on the same journals in the gear carriers as said pinions N) drive the sun gears P.

There is no call for such process of zeroizing in a key-set crank-operated adding and listing machine, such as that under consideration, and I have referred to it somewhat specifically merely by way of introduction to the subject of subtractive operation of the registering mechanism which involves a preliminary action suggestive of that constituting the first part of a zeroizing operation of the character above referred to though the effect produced is entirely different and it is therefore important that the two actions be distinguished at the outset. It will have been noted that when describing said zeroizing operation mention was made of the unlocking of the numeral wheels and the locking of the intermediate internal gear wheels C. If the latter remain unlocked and the numeral wheels locked then the lifting of the arms H cannot result in forwardly rotating the numeral wheels, whereas it will result in rearwardly turning the intermediate internal gears C varying extents according to the registering state of the numeral wheels. Obviously continued backward turning of the numeral wheels for subtraction purposes cannot be practised unless coöperative relationship between the snail back cams and the arms H is suspended, that is to say, unless the studs H' are removed from the paths of the radial shoulders of said cams. The lifting of the arms H does this and the backward turning of the intermediate wheels C, in effecting backward turning of the higher order numeral wheels, properly prepares those wheels for the work of subtraction with necessary borrowing to obtain the correct remainder. It should be understood that the purpose is to effect borrowing, not by periodical transmission of complete impulses, as in the case of carrying when the studs H' drop over the radial shoulders of the cams, but by gradual or divided transmission sometimes termed in this art a "crawl." Thus the transmission is not by planetary action as to the pinions N and O which, after their limited preliminary action as planetary gears due to the swinging of their carriers L by the arms H, then serve during the performance of subtraction merely as intermediate pinions for transmitting movement to the internal gears C. It will consequently be understood that the borrowing action is going on all the time, that is to say, whenever a lower order wheel is in backward motion the next higher order wheel is receiving the proportionate amount of backward motion so that when the lower order wheel has made a complete rotation the higher order wheel will have turned backward one step additional to such backward movement as it may primarily receive from its own actuating wheel A'. In short for every step of movement of the lower wheel the next higher wheel receives one-tenth of a step of movement.

Reverting to the matter of the preliminary setting for subtraction (in which connection the diagrammatic illustration supplied by Figs. 5 and 6 will be found instructive) and bearing in mind that the gearing is so proportioned that the return swing of the gear carrier measured by the height of the cam G turns the intermediate internal gear wheel C one-fifth of a rotation and the higher order registering wheel B one-tenth of a rotation under adding conditions and that conversely, when effecting the zeroizing according to the practice heretofore mentioned, a full initial swing of the gear carrier with the intermediate wheel locked and the lower order registering wheel unlocked the latter is given a complete forward rotation (as in the case of the units wheel of the former construction when standing at zero), it follows that a full initial swing of the gear carrier while the lower order registering wheel remains stationary and the intermediate wheel is free to turn backward, will result in that wheel being turned backward one-fifth of a rotation and the higher order registering wheel consequently turned backward one-tenth of a rotation. This is what occurs as to a higher order wheel next adjacent a lower order wheel standing at zero when there is a preliminary setting for subtraction. Thus the borrowing of "one" from the higher order wheel in such case is anticipated. This is illustrated in Fig. 6 which shows a condition resulting from the lifting of the arm H when the associated wheel A is at zero and the higher order wheel B also at zero, the latter being shown in this figure of the drawings as having turned backward to the "9" position.

The necessity for this will be apparent when due consideration is given to the fact that a backward turning of the lower order wheel from "0" to "9" for the purpose of subtracting "one" in the units column only effects one-tenth of a step of movement of the higher order wheel. As it is, the full borrowing movement has been anticipated and the subtraction of one in the units column simply turns the higher order wheel one-tenth of a step further backward as the first fraction of the next complete borrowing movement, or it may be considered that this one-tenth of a step of movement of the higher order wheel is the completion of the first borrowing. Now, if the units wheel should be at some position other than zero, for instance at "6," then of course the arm H will be in a partially elevated position upon the cam and in being lifted the rest of the way will not transmit one-tenth of a rotation to a higher order wheel but only four-tenths of a step of backward rotation. This will be seen to properly prepare the higher order wheel for its being borrowed from by the lower order wheel when the latter is then subtracted from, for when the latter is turned backward from the "6" position to zero, the remaining six-tenths of a step of backward turning of the higher order wheel will occur. So long as the lower order wheel remains at zero, a lowering of the arm H will again advance the higher order wheel to its original registering position but if the lower order wheel is turned backward beyond zero its cam G passes under the stud H' and a resetting to adding condition does not result in so turning forward the higher order wheel which will then continue to register the lower numeral.

Under a condition such as illustrated by Figs. 5 and 6 the backward turning of the higher order wheel in the setting operation will occur when the stud H' of the higher order arm H would be directly in front of the shoulder of the higher order cam and would therefore interfere with the backward turning of this higher order wheel in the absence of provisions to take care of this situation. I make provision for this contingency by providing a yielding connection between the arm H and the gear carrier L. Thus the link M is elongated and slotted lengthwise, as shown at M' and the stud L' of the gear carrier, which stud occupies said slot, is connected by a spring J' with the stud H² of the arm H on which the link is pivoted. This arrangement permits the arm H to be elevated the full distance notwithstanding the temporary obstruction to the swinging of the gear carrier occasioned by the stud H' of the higher order lever H being in front of the shoulder of the higher order cam. It will be understood that the higher order arm is being elevated simultaneously with the lower order arm so that the obstructing stud will eventually clear the cam shoulder whereupon the spring J' will cause the lower order gear carrier to follow up the previously elevated lower order arm H and link M and the higher order wheel will be given its backward turning movement which carries the high part of its cam under the stud H' of the higher order arm H.

In incorporating a registering mechanism of the above description into an adding and listing machine of the type herein shown, said mechanism is located at the front, where registering wheels are commonly found in this type of machine, below a cover plate 2 having sight openings 2ª, one over each of the registering wheels and through which the inscriptions on the numeral wheel may be read in true alinement when the machine is in an adding condition, it being clear from what has already been set forth that the manner of borrowing in subtraction precludes such alinement when the machine is in a subtracting condition, except in the case of putting the machine in the subtracting condition when the wheels are all showing ciphers and the subtraction-setting moves all the higher order wheels back to "9." It will of course be understood that there is associated with each one of the wheels one of the levers H and that each one of these levers, except that associated with the wheel of highest order, is coupled through one of the slotted links M with a gear carrier. It will further be understood that any partial borrowing movement caused by the elevating of the arms or by the backward turning of lower order wheels will be taken up again with the restoration of the machine to an adding condition so that the correct remainder will then show in true alinement under the said sight openings. In the case of a full backward one-step movement, such as that heretofore instanced and illustrated in Fig. 6, and the restoration to adding condition with a lower order wheel still at zero, the lowering of the arm associated with that wheel will of course take up the complete one-step movement just as such a movement is effected in an additive carrying operation and such action will continue across the series of wheels as far as ciphers may have been in registration and nines brought under the sight openings by putting the machine into subtracting condition. For example, if all the wheels were registering ciphers and the machine was then put into subtracting condition the wheel of lowest order would continue to display its cipher and all the other wheels would display nines in alinement with that cipher. If the machine was then restored to adding condition the lowest order lever H would drop past the shoulder of the associated cam and thereby transmit a one-step forward movement to the next higher order wheel which would carry the high end of its cam past the stud of the associated lever whereupon the latter would drop and transmit a one-step movement to the next wheel, and so on, after the manner of a zeroizing operation, such as heretofore referred to in connection with the prior mechanism.

In the construction here shown the lifting of the gang of arms H is effected by the rocking of a shaft S which is milled out at intervals to receive rearward extensions H³ of said arms respectively, as shown in Fig. 3, so as to permit said arms to fully lower. The rocking of this shaft, as illustrated in Fig. 4, will obviously have the effect of lowering the rear extensions of the arm and elevating the arms themselves. On the left-hand end of said shaft there is secured a crank arm S' which is connected by a rearwardly extending link S² with a hand lever S². The latter is pivoted to a bracket on the base of the machine and projects upwardly to the left of the regular keyboard of the machine conveniently for manipulation. It is preferably equipped with a knob or handle and it will be seen that when in a rearward position, as shown in Fig. 8 an adding condition of the registering mechanism obtains, whereas when said hand lever is thrown forward to the position shown in Fig. 7 a subtracting condition is brought about. Further specific reference will be made to the function of this hand lever or subtraction key after a description of the actuating devices which drive the registering wheels under control of amount keys and which set up in type the amounts registered and which also serve to set up in type totals and remainders as controlled by backward rotation of the registering wheels.

Referring then to these actuating devices, the reference numeral 3 designates sliding rack bars of which counterparts to a considerable extent may be seen in the aforesaid Pike patents, the main difference being that in the present instance the rack teeth 3ª are formed upon the bars themselves and not upon separate pieces slidingly mounted upon the bars, and that these rack bars are collectively movable up and down to engage them with and disengage them from the gear wheels which transmit motion to the registering wheels. Gear wheels which directly mesh with these racks respectively are designated by the letter Q and other gear wheels turning with these gear wheels Q respectively and meshing respectively with the aforesaid gears A' B' and similar gears associated with the other registering wheels, are designated by the reference letter E². Normally the racks are in mesh with the wheels Q but in an adding operation they are dropped out of mesh at the outset so that the racks may advance distances determined by amount keys while disengaged from the registering mechanism. Then at the beginning of the last half cycle of operation of the machine the racks are reëngaged with the gears Q and when returning to their normal positions rotate said gears whereby the requisite degree of additive movement is imparted to the registering wheels in all orders where keys have been depressed. The amount keys are designated by the numeral 4 and serve in a familiar manner to set stops to limit forward movement of the rack bars. They also operate as usual to unlatch the bars. The latter are pivotally connected as usual to bell-crank levers 5 hung upon a rock shaft 6 and constituting type carriers and in the present instance said pivotal connection is utilized in connection with the dropping and lifting of the rack bars at their forward ends. Here they are bifurcated, as shown at 3ᵇ to embrace antifriction rollers 7 upon the cross shaft 8 of a bail comprising a series of arms 9 fastened to a rock shaft 10 and a similar though more rearwardly extended left side arm 11 to which are applied the means for raising and lowering this bail. Upwardly turned rear end portions of the arms 9 and a corresponding portion of the side arm 11 support another cross-rod 12 which operates a series of locking pawls R for engaging the wheels Q respectively to lock the same when the racks are disengaged from them. Said pawls are pivoted upon a frame cross-rod 14 and each pawl has an arm R' with a bifurcated end embracing the bail cross-rod 12, as clearly shown in Fig. 1.

Springs 15 applied to the rack bars respectively tend to advance them but are normally restrained by a bail 16 secured to the rock shaft 6, which is a very familiar arrangement in this type of machine, the said bail being swung forward and then rearward in every operation of the machine. The control mechanism whereby the engagement and disengagement between racks and registering mechanism is regulated, though similar in principle to that which is familiar in this type of machines, varies sufficiently to call for specific description especially as its modified form as compared with prior constructions, has to do with the novel subtracting feature of the present invention.

Referring to Figs. 13, 14 and 15 the before mentioned left side bail arm 11 has a roller stud 11ª which occupies the cam slot 17 of a vibratory plate 18 to which is coupled a link 19 extending rearward to a rock shaft 20 on which it slides as a guide. Just forward of its bifurcated rear end there is pivoted upon this link a pitman 21 which is forked at its rear end and formed with upper and lower notches 21ª and 21ᵇ at the bases of flaring mouths 21ᶜ and 21ᵈ. A rocker plate 30 is pivoted on the frame of the machine and carries upper and lower studs 30ª and 30ᵈ for engagement with the said notches 21ª and 21ᵇ respectively, the latter stud being normally seated in its notch, as shown in Fig. 13. An arm 40 secured to the rock shaft 20 carries a spring-actuated wiper pawl 41 adapted to operate upon the studs 30ª and 30ᵇ. It normally lies against the latter stud, as shown in Fig. 13, and in the first part of an operation of the machine operates upon said stud to thrust the pitman 21 rearward and thereby the link 19, thus swinging the cam 18 rearward and lowering the set of rack bars out of engagement with the gear wheels Q (Fig. 12). The wiper pawl then leaves said stud, straightens, and swings on upward with the arm 40 and is brought into engagement with the upper stud 30ª, which, as a result of the rearward thrust of the pitman and consequent rocking of the plate 30, has been swung forward (Fig. 13ª) into the path of the then straightened wiper pawl. Meanwhile the rack bars which have been unlatched by depression of amount keys have moved forward distances determined by those keys. Upon the return stroke of the arm 40 its wiper pawl 41 acts upon the stud 30ª to rock the plate 30 back to its normal position and thereby cause the lower stud 30ᵇ to thrust the pitman 21 forward and so swing back the cam plate 18 and reëngage the racks with the wheels. As the said arm 40 swings on down to reëngage its wiper pawl with the lower stud 30ᵇ, the advanced rack bars are forced rearward by the restoring bail 16 and additive registration is effected upon the numeral wheels.

Referring next to the subtraction control the aforesaid pitman 21 extends forward of its pivot and alongside the hand lever S³. The latter carries a roller stud S⁴ which normally occupies a notch 21ᵉ in the pitman, the latter having an upwardly extending cam finger 21ᶠ forward of said notch and terminating in a straight top edge, as shown in Figs. 13, 14 and 15. When the hand lever or subtraction key S³ is thrown forward to the position shown in Fig. 14, its roller stud S⁴ rides up the rear edge of said cam finger and depresses the forward arm of the pitman and correspondingly lifts the forked rear end of the pitman, disengaging the lower notch 21ᵇ from the lower stud 30ᵇ and engaging the upper notch 21ª with the stud 30ª. This involves a rocking of the plate 30 which is freely mounted upon the frame of the machine so that as the forked end of the pitman rises the comparatively light spring applied to the wiper pawl 31 causes the latter to rock said plate 30 and bring its upper stud 30ª into line with the upper notch 21ª of the pitman. This change in relationship of parts having been effected by throwing forward the subtraction key, then when the operation of the machine starts the wiper pawl turns idly over the lower stud 30ᵇ and the racks remain in mesh with the gear wheels Q and therefore in all orders where racks have been unlatched the registering wheels will be turned backward distances determined by the depressed amount keys. Meantime the arm 40 swings upward to the position shown in Fig. 15 and its wiper pawl becomes engaged with the upper stud 30ª while the latter is seated in the upper notch 21ª. Then as the last half cycle of operation of the machine starts said wiper pawl acts upon said stud and thrusts rearward the pitman 21 thereby disengaging the racks from said gears Q so that they return to normal out of engagement. They are caused to reëngage the gears as the operation of the machine terminates by direct action of the arm 40 upon the link 19. Thus said arm has a forward and downwardly extending branch 40ª whose extremity acts upon a roller stud 19ª carried by said link. The stud 30ª remains seated in the notch 21ª and the plate 30 is rocked back to the position shown in Fig. 14. In the forward and backward movement of the pitman under this subtracting adjustment the straight top edge of the cam finger 21ᶠ works forward and back under the roller stud S⁴ so that the pitman is maintained in the angular position to which it has been brought by the throwing forward of the subtraction key lever.

A somewhat similar change in relationship of parts of the control mechanism to that effected by the throwing forward of the subtracting key lever is brought about by depression of the total key 50 (Figs. 16 and 17) which is mounted upon a lever 51 pivoted upon the rock shaft 20, its rear end carrying a pivoted spring-held tappet-piece 52 which operates upon a stud 53 carried by the pitman 21. The rear end of the latter is normally held down by a short spring 54 which connects said stud with a stud on a depending portion of the said tappet-piece, and when the subtraction key lever is operated the said spring stretches. The tappet piece cannot swing upon its pivot and follow the pitman in this case because a laterally turned lip 52ª of said tappet-piece engages under the rear end of the total key lever 51. The total key is never used except when the subtraction key lever is out of use and the forked end of the pitman consequently in its lower position as illustrated in Fig. 16. The effect of depressing the total key and thereby elevating the rear arm of the lever 51 is to raise the forked rear end of the pitman, as illustrated in Fig. 17, by reason of the action of the tappet-piece 52 against the stud 53. The spring 54 is of course offering no resistance to the lifting of the rear end of the pitman, and another spring 55, which connects the tappet-piece with the lever 51, is of sufficient strength not to yield. At the conclusion of this operation the arm 48ª acts upon link 19 to reengage the racks and gears as in the case of subtraction.

It will be understood that the operation of the machine with the total key depressed is the familiar one which consists in permitting racks to advance in mesh with registering gears as the latter rotate backward until the numeral wheels came to "0" position, and then in disengaging the racks so that the wheels (Figs. 7 to 10) stand clear. In the present instance the "0" position of the numeral wheels in backward rotation is determined by the striking of lugs 60 on the wheels against stop pawls 61 which are pivoted upon a rock shaft 62 at the front of the machine and are held by springs 63 in the paths of said lugs. In the forward turning of the wheel the lugs simply wipe past these stop pawls. The occasion for mounting these stop pawls upon the rock shaft is to provide for disabling them when subtraction is to be performed and the wheels are to rotate backward past zero. Thus said pawls are unified with yokes 61$^a$, and pins 62$^a$ on the rock shaft adapted to act against the yokes and thereby throw the pawls back, as shown in Fig. 7. An arm 65 secured to said rock shaft extends rearward therefrom and has a cam slot 65$^a$ which is occupied by a roller stud 66 on the before-mentioned crank arm S'. The forward throw of this crank arm caused by pulling forward the subtraction key lever results in rocking the said arm 65 upward and so throwing back the stop pawls. The latter are preferably limited as to return movement into the paths of the numeral wheel lugs 65$^a$ by fingers 61$^b$ of the yokes striking against the rock shaft 10, friction between the pawls and the wheels being thus obviated.

A sub-total key 70 of familiar character (Figs. 16 and 18) surmounts a lever 71 which is pivoted on rock shaft 20 and has a lug 71$^a$ overlying the total key lever 51 so that when said sub-total key is depressed the total key lever is depressed. However, the effect is not the same, for the sub-totaling operation involves meshing of the racks with the gear wheels Q throughout the operation of the machine, and therefore the forked end of the pitman should occupy a neutral position. This is effected by limiting the upward movement as compared with that produced by depression of the total key. The sub-total key lever 71 has an upwardly projecting finger 71$^b$ with a stud 71$^c$ which is brought forward and downward into contact with a hump 21$^g$ on the arching portion of the pitman. The pitman is thus stopped at an intermediate and neutral position, the spring 55 yielding so that the tappet-piece 52 turns slightly about the stud 53, as illustrated in Fig. 18. Here it will be noted that the upper and lower studs 30$^a$ and 30$^b$ are both disengaged from the upper and lower notches 21$^a$ and 21$^b$ so that in the swinging up and down of the arm 40 its wiper pawl 41 plays idly over the said studs slightly vibrating the plate 30 without any appreciable effect upon the pitman. Consequently the racks remain engaged with the gears Q throughout the entire operation and after the numeral wheels have been turned backward to zero and their total registration set up in type and printed, that same registration will be restored.

In the interest of safeguarding the machine against misoperation it is desirable to supply interlocking devices to prevent the simultaneous movement of parts which should not be in operation at the same time. When a clearing total is to be taken the sub-total key should of course be kept out of action. I therefore provide for locking this key out of action by the act of depressing the total key. Thus a link 80 (Fig. 16) connects the rear arm of the total key lever 51 with a hook 81 secured to a rock shaft 82 in bearings on the base of the machine. When the total key is individually depressed this hook is rocked over a stud 83 on a lower branch 71$^e$ of the sub-total key lever 71. There is formed integral with this hook an arm 80$^a$ which constitutes one member of an interlock between the total key lever and the actuating mechanism of the machine. The other member of this interlock is in the form of a hook 84 secured to the rock shaft 20. This hook normally stands forward of a stud 80$^b$ on the end of the said arm 80$^a$, as shown in Fig. 16. Upon operation of the machine without preliminary depression of the total key lever, either by its own key or by the sub-total key, said hook passes immediately under said stud and prevents depression of either of said keys after the operation of the machine has started. These devices also insure full depression of total or sub-total key before a totaling operation of the machine is started, for the reason that during depression of either of said keys the stud 80$^b$ will pass across the end of the hook. The latter also serves the purpose of holding down the keys during the totaling operation, by engaging over the top of the stud 80$^b$.

Interlocks of the above character are now so familiar in this art that any more detailed description than as above pointed out seems to be unnecessary. Similar interlocks are provided between the subtraction key and the actuating mechanism of the machine and between the subtraction key and the total keys. Thus, as shown in Figs. 16, 17 and 19, a link 90 connects the subtraction key lever S$^3$ with a rocker-piece 91 loosely mounted upon the rock shaft 82, said rocker-piece having a stud 91$^a$ to coöperate with a second hook 92 secured to the actuating rock shaft 20. Fig. 19 illustrates the condition when the subtraction key is set and the machine half operated, the hook 92 having been swung rearward over the stud 91$^a$ so that the subtraction key lever is locked in said position throughout the operation of the machine. In an operation of the machine with the subtraction key thrown rearward, as in Figs. 16 and 17, said hook passes under said stud to prevent said key being thrown forward during the operation of the machine. Then the striking of the end of the hook against the stud will prevent operation of the machine before the said key has been fully thrown forward in preparation for the work of subtraction. The said link 90 also serves as an interlocking device between the subtraction key and the total keys.

Thus it is formed with a wide upstanding lug 90ª adapted upon forward movement of the subtraction key to pass under a stud 51ᵉ on the total key lever. In this connection it will be understood from what has heretofore been set forth concerning the character of the subtracting operation that totaling operations should not be practised under the subtracting adjustment since the registering wheels are habitually out of alinement as to the remainder-registration, whereas the throwing back of the subtraction key lever brings about the proper alinement for insuring alinement of types under backward rotation of the wheels for totaling purposes. The throwing forward of the subtraction key lever while the total key is down cannot occur because depression of the total key, either individually or as an accompaniment to the depression of the sub-total key, takes the stud 51ᵉ down in front of the lug 90ª, as shown in Fig. 17.

I claim:

1. A set of registering wheels connected by planetary gearing with provisions for periodical transmission of a full carrying movement from a lower order wheel to the neighboring higher order wheel as an incident to the forward turning of the former from its highest registering position to zero; in combination with means for effecting gradual or divided backward borrowing movement of a higher order wheel through the same gearing as an incident to backward turning of the next lower wheel through its registering range, together with provisions for preliminarily setting the gearing according to the registering state of the wheels to take up any necessary part of a complete borrowing movement.

2. A set of registering wheels connected by planetary gearing comprising oscillatory gear-carriers and cams for operating the same; in combination with means for suspending coöperative relationship between cams and gear carriers and differentially setting back the registering wheels, preparatory to reversely turning the same for the performance of subtraction.

3. A set of registering wheels connected by planetary gearing comprising oscillatory gear-carriers and vibrating arms and cams for operating the same; in combination with means for suspending coöperative relationship between cams and gear carriers and differentially setting back the registering wheels, preparatory to reversely turning the same for the performance of subtraction, a yielding connection being provided between the oscillatory gear-carriers and the vibratory arms.

4. The combination of a pair of registering wheels having internal gears; actuating wheels carrying planetary pinions in mesh with said internal gears respectively; sun gears with which said pinions mesh respectively; an internal gear unified with the sun gear of the higher order; an oscillatory gear carrier; a pair of gear pinions mounted therein and one meshing with the last-mentioned internal gear; a sun gear unified with the lower order registering wheel and meshing with the other of said gear pinions; a snail cam unified with said lower order wheel; a vibrating spring-actuated member engaged by said cam and operatively connected with said gear carrier; and means for displacing said member and thereby reversely turning the higher order wheel and suspending coöperative relationship between said member and the cam to permit reverse rotation of the lower order wheel for subtractive registration and proper borrowing from the higher wheel in gradual or divided movement imparted thereto through the planetary gearing.

5. The combination of a pair of registering wheels having internal gears; actuating wheels carrying planetary pinions in mesh with said internal gears respectively; sun gears with which said pinions mesh respectively; an internal gear unified with the sun gear of the higher order; an oscillatory gear-carrier, a pair of gear-pinions mounted therein and one meshing with the last-mentioned internal gear; a sun gear unified with the lower order registering wheel and meshing with the other of said gear pinions; a snail cam unified with said lower order wheel; a vibrating spring-actuated member engaged by said cam and yieldingly connected with said gear-carrier; and means for displacing said member and thereby reversely turning the higher order wheel and suspending coöperative relationship between said member and the cam to permit reverse rotation of the lower order wheel for subtractive registration and proper borrowing from the higher order wheel in gradual or divided movement imparted thereto through the planetary gearing.

6. The combination of a pair of registering wheels having internal gears; actuating wheels carrying planetary pinions in mesh with said internal gears respectively; sun gears with which said pinions mesh respectively; an internal gear unified with the sun gear of the higher order; an oscillatory gear-carrier; a pair of gear pinions mounted therein and one meshing with the last-mentioned internal gear; a sun gear unified with the lower order registering wheel and meshing with the other of said gear pinions; a snail cam unified with said lower order wheel; a vibratory spring-actuated arm engaged by said cam; a link yieldingly connecting said arm with the aforesaid gear carrier; and means for displacing said arm and thereby swinging said carrier and reversely turning the higher order wheel and suspending coöperative relationship between said arm and said cam to permit reverse rotation of the lower order wheel for subtractive registration and proper borrowing from the higher wheel in gradual or divided movement imparted thereto through the planetary gearing.

7. The combination of a pair of registering wheels having internal gears; actuating wheels carrying planetary pinions in mesh with said internal gears respectively; sun gears with which said pinions mesh respectively; an internal gear unified with the sun gear of the higher order; an oscillatory gear-carrier; a pair of gear pinions mounted therein and one meshing with the last-mentioned internal gear; a sun gear unified with the lower order registering wheel and meshing with the other of said gear pinions; a snail cam unified with said lower order wheel; a vibratory spring-actuated arm engaged by said cam; a link yieldingly connecting said arm with the aforesaid gear-carrier; a rock shaft of cam cross-section engaging said arm and adapted when turned one way to displace the same and thereby swing the said carrier and reversely turn the higher order wheel and suspend coöperative relationship between the arm and the snail cam to permit reverse rotation of the lower order wheel for subtractive registration and proper borrowing from the higher wheel in gradual or divided movement imparted thereto through the planetary gearing; and a handle for operating said rock-shaft.

8. The combination of a set of registering wheels; planetary gearing interposed between them with provisions for periodical transmission of a full carrying movement from a lower order wheel to the neighboring higher order wheel as an incident to forward turning of the former from its highest registering position to zero; actuating gears for the wheels respectively; differentially movable actuators engageable with and disengageable from the said actuating gears respectively; means for normally regulating periods of engagement and disengagement of actuators and wheels to effect additive turning of the latter; and means for reversing the periods of engagement and disengagement to effect subtractive turning of said wheels and for thereafter effecting gradual or divided backward borrowing movement of a higher order wheel through the planetary gearing which connects it with the lower order wheel, such gearing having first been set according to the registering state of the wheels to preliminarily take up any necessary part of a complete borrowing movement.

9. The combination of a set of registering wheels; planetary gearing interposed between them with provisions for periodical transmission of a full carrying movement from a lower order wheel to the neighboring higher order wheel as an incident to forward turning of the former from its highest registering position to zero; actuating gears for the wheels respectively; differentially movable actuators engageable with and disengageable from the said actuating gears respectively; means for normally regulating periods of engagement and disengagement of actuators and wheels to effect additive turning of the latter; means for setting said regulating means to effect reverse turning of wheels to zero while engaged with the actuators; zero stops for the wheels under such reverse turning; and means for setting said regulating means to effect subtractive turning of said wheels and for thereafter effecting gradual or divided backward borrowing movement of a higher order wheel through the planetary gearing which connects it with the lower order wheel,—such gearing having first been set according to the registering state of the wheels to preliminarily take up any necessary part of a complete borrowing movement,—with provisions for disabling the aforesaid zero stops as an incident to operation of the last specified means.

10. The combination of a pair of registering wheels having internal gears; actuating wheels carrying planetary pinions in mesh with said internal gears respectively; sun gears with which said pinions mesh respectively; an internal gear unified with the sun gear of the higher order; an oscillatory gear-carrier; a pair of gear pinions mounted therein and one meshing with the last-mentioned internal gear; a sun gear unified with the lower order registering wheel and meshing with the other of said gear pinions; a snail cam unified with said lower order wheel; a vibrating spring-actuated member engaged by said cam and operatively connected with said gear-carrier; actuating gears for the wheels respectively; differentially movable actuators engageable with and disengageable from the said actuating gears respectively; means for normally regulating periods of engagement and disengagement of actuators and wheels to effect additive turning of the latter; and means for setting said regulating means to effect reverse turning of the actuating gears for subtraction, and for displacing the aforesaid vibratory spring-actuated member to suspend coöperative relationship between it and the snail cam whereby to permit subtractive turning of the lower registering wheel and borrowing from the higher wheel by gradual or divided movement imparted thereto through the planetary gearing,—the displacement of said member and consequent shifting of the gear carrier effecting backward turning of the higher wheel to preliminarily take up any necessary part of a complete borrowing movement.

11. The combination of a pair of registering wheels having internal gears; actuating wheels carrying planetary pinions in mesh with said internal gears respectively; sun gears with which said pinions mesh respectively; an internal gear unified with the sun gear of the higher order; an oscillatory gear carrier; a pair of gear pinions mounted therein and one meshing with the last-mentioned internal gear; a sun gear unified with the lower order registering wheel and meshing with the other of said gear pinions; a snail cam unified with said lower order wheel; a vibrating spring-actuated arm engaged by said cam, a link yieldingly connecting said arm with the aforesaid gear carrier; actuating gears for the wheels respectively; differentially movable actuators engageable with and disengageable from the said actuating gears respectively; means for normally regulating periods of engagement and disengagement of actuators and wheels to effect additive turning of the latter; means for setting said regulating means to effect reverse turning of the actuating gears for subtraction; and coördinated means for displacing the aforesaid spring-actuated arm and thereby swinging the gear carrier and reversely turning the higher order wheel and suspending coöperative relationship between the arm and the snail cam to permit reverse rotation of the lower order wheel for subtractive registration and proper borrowing from the higher order wheel in gradual or divided movement imparted thereto through the planetary gearing.

12. The combination of a pair of registering wheels having internal gears; actuating wheels carrying planetary pinions in mesh with said internal gears respectively; sun gears with which said pinions mesh respectively; an internal gear unified with the sun gear of the higher order; an oscillatory gear-carrier; a pair of gear pinions mounted therein and one meshing with the last-mentioned internal gear; a sun gear unified with the lower order registering wheel and meshing with the other of said gear pinions; a snail cam unified with said lower order wheel; a vibratory spring-actuated arm engaged by said cam; a link yieldingly connecting said arm with the aforesaid gear-carrier; a rock shaft of cam cross-section engaging said arm and adapted when turned one way to displace the same and thereby swing the said carrier and reversely turn the higher order wheel and suspend coöperative relationship between the arm and the snail cam to permit reverse rotation of the lower order wheel for subtractive registration and proper borrowing from the higher wheel in gradual or divided movement imparted thereto through the planetary gearing; actuating gears for the wheels respectively; differentially movable actuators engageable with and disengageable from the said actuating gears respectively; means for normally regulating periods of engagement and disengagement of actuators and wheels to effect additive turning of the latter; means for setting said regulating means to effect reverse turning of the actuating gears for subtraction, and for displacing the aforesaid vibratory spring-actuated member to suspend coöperative relationship between it and the snail cam whereby to permit subtractive turning of the lower registering wheel and borrowing from the higher wheel by gradual or divided movement imparted thereto through the planetary gearing,—the displacement of said member and consequent shifting of the gear-carrier effecting backward turning of the higher wheel to preliminarily take up any necessary part of a complete borrowing movement—; and a manipulative device for operating said setting means and operating the aforesaid cam rock-shaft.

13. The combination of a pair of registering wheels having internal gears; actuating wheels carrying planetary pinions in mesh with said internal gears respectively; sun gears with which said pinions mesh respectively; an internal gear unified with the sun gear of the higher order; an oscillatory gear-carrier; a pair of gear pinions mounted therein and one meshing with the last-mentioned internal gear; a sun gear unified with the lower order registering wheel and meshing with the other of said gear pinions; a snail cam unified with said lower order wheel; a vibratory spring-actuated arm engaged by said cam; a link yieldingly connecting said arm with the aforesaid gear-carrier; a rock shaft of cam cross-section engaging said arm and adapted when turned one way to displace the same and thereby swing the said carrier and reversely turn the higher order wheel and suspend coöperative relationship between the arm and the snail cam to permit reverse rotation of the lower order wheel for subtractive registration and proper borrowing from the higher wheel in gradual or divided movement imparted thereto through the planetary gearing; actuating gears for the wheels respectively; differentially movable actuators engageable with and disengageable from the said actuating gears respectively; means for normally regulating periods of engagement and disengagement of actuators and wheels to effect additive turning of the latter; means for setting said regulating means to effect reverse turning of the actuating gears for subtraction, and for displacing the aforesaid vibratory spring-actuated member to suspend coöperative relationship between it and the snail cam whereby to permit subtractive turning of the lower registering wheel and borrowing from the higher wheel by gradual or divided movement imparted thereto through the planetary gearing—the displacement of said member and consequent shifting of the gear-carrier effecting backward turning of the higher wheel to preliminarily take up any necessary part of a complete borrowing movement; and a hand-lever operating said setting means and the aforesaid cam rock-shaft.

CLAIBORNE W. GOOCH.

Witnesses:
W. L. HOAGLAND, Jr.,
R. S. MIELERT.